United States Patent [19]

Kesting

[11] 3,807,170
[45] Apr. 30, 1974

[54] FUEL INJECTION SUBSYSTEM FOR SUPERSONIC COMBUSTION

[75] Inventor: Lawrence W. Kesting, Huntsville, Ala.

[73] Assignee: The United States of America as represented by the Secretary of the Army, Washington, D.C.

[22] Filed: Mar. 16, 1967

[21] Appl. No.: 624,669

[52] U.S. Cl.............. 60/243, 60/39.48, 60/270, 244/3.1
[51] Int. Cl................................ F02k 3/00
[58] Field of Search............. 60/207, 224, 241–243, 60/253, 250, 270

[56] References Cited
UNITED STATES PATENTS
2,419,866  4/1947  Wilson.................................. 60/253
3,034,294  5/1962  Brown................................... 60/207
3,340,690  9/1967  Norman et al........................ 60/243

Primary Examiner—Samuel Feinberg
Attorney, Agent, or Firm—Edward J. Kelly; Herbert Berl; Harold W. Hilton

[57] ABSTRACT

A fuel injection subsystem for a missile having an engine provided with a predetermined fixed geometry for subsonic and supersonic operation. The subsystem utilizes both solid and liquid fuels to provide a multiplicity of engine operating conditions. According to the operating requirements, a central control station provided for gases from the solid fuel to: (a) be ducted to various points in the combustor; (b) pressurize the liquid fuel tanks, and; (c) function as a pilot light for the liquid propellant. The liquid fuels are: (a) throttled for variable flow; (b) secondarily injected to redirect hot gases from the solid fuel, and; (c) used as a regenerative coolant.

10 Claims, 4 Drawing Figures

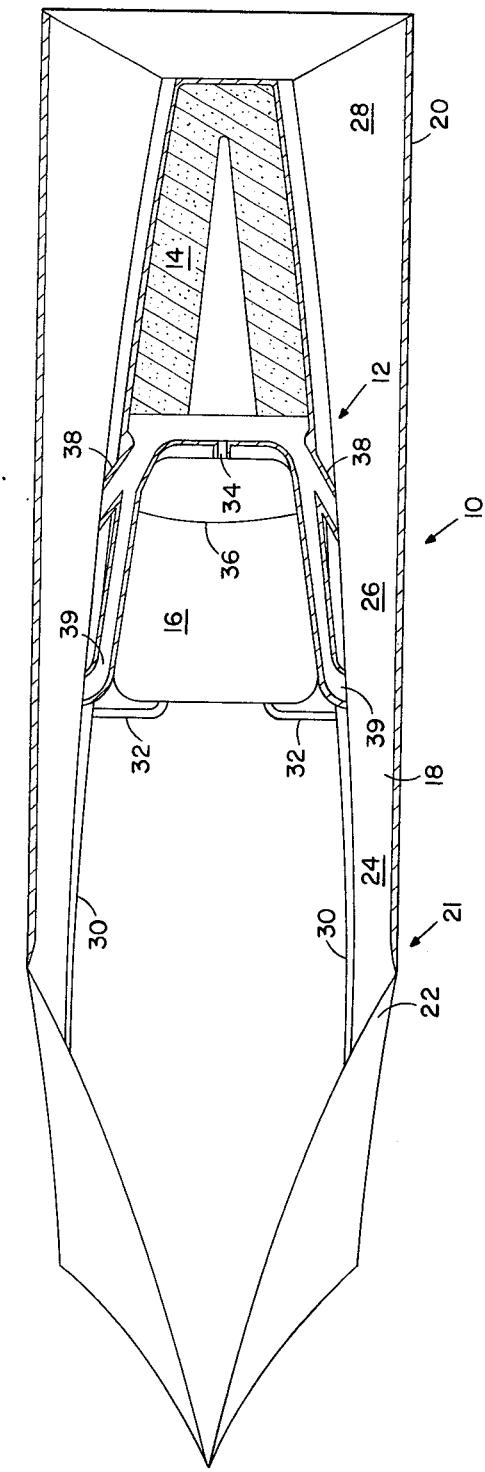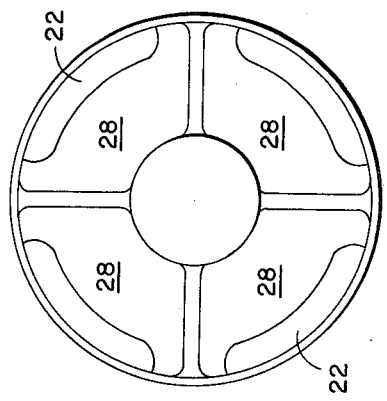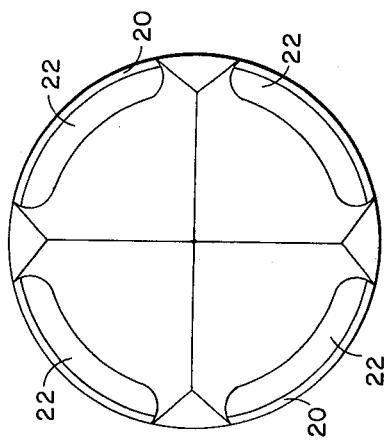

FUEL INJECTION SUBSYSTEM FOR SUPERSONIC COMBUSTION

BACKGROUND OF THE INVENTION

The present invention relates to a fuel system for rocket propelled missiles and more particularly to a supersonic combustion engine for such missiles which utilizes both solid and liquid fuels.

The supersonic combustor is herein referred to as a duct wherein air flows at supersonic velocities and fuel is injected and chemically reacts with the air, resulting in an increase in velocity of the air and/or products of the reaction.

Missile propulsion engines utilizing supersonic combustion have application to many future missiles for military applications. For example, in air defense systems supersonic combustion engines are foreseen as (a) second or third stage sustainers for high altitude and on the deck intercept; (b) propulsion units for gun launched missiles; and (c) sustainers for parking orbit missiles. In general support, this type of propulsion shows promise of reducing missile weight for both low and high altitude trajectories, and by making the engines compact enough, the missiles have application in the flat hypervelocity trajectories desired for close support weapons.

The following general characteristics apply to systems utilizing the principles of the present invention: (a) the fuels are storable and nontoxic; (b) engine geometry is fixed; (c) engine efficiency is good at low, high and intermediate altitudes; (d) engine operation is efficient at low and high flight Mach numbers and smoothly transcends the subsonic to supersonic combustion mode.

Analytical and experimental investigation of supersonic combustion engines using storable, nontoxic fuels is just beginning. Preliminary work indicates that the same engine geometry can be used to transcend the subsonic to the supersonic combustion mode if the points of fuel injection are moved forward into the diffuser.

Some of the advantages in using solid fuels in a missile are: (1) the delivery of high temperature hydrogen to the combustion chamber which provides for (a) rapid mixing in the air stream, (b) fast ignition, (c) short chamber length, (d) low chamber Mach number application, (e) high combustion efficiency; (2) high density; (3) low carbon content; (4) low molecular weight; (5) no limits on air to fuel ratio for inflammability.

Such solid fuels that will meet the storage and operational requirements are: polybutadienes, polyurethanes and double-base compositions with boron additives and ammonium perchlorate oxidizers.

Some advantages of liquid fuels are: fuel flow is easily throttled and redirected which provides a compensation for changes in speed and altitude; regenerative cooling; high heat of combustion.

Some liquid fuels that meet the storage and operational requirements are: kerosenes, acetylene, propylene, pentaborane, and hydrazine.

SUMMARY OF THE INVENTION

A fuel injection subsystem for a missile provided with a predetermined fixed geometry for subsonic and supersonic velocities and in which both solid and liquid fuels are combined to provide a multiplicity of engine operating conditions. A central control station indicates the desired operational characteristics and through a plurality of flow regulators, pressure controllers, the solid and liquid fuels are utilized in a manner to provide the desired outputs. The solid and liquid fuels are combined in an injection system for a supersonic combustor and gases from the solid fuel are: (1) ducted to various points in the combustor, (2) used to pressurize the liquid fuel tanks, and (3) function as a pilot light. The liquid fuels are: (1) throttled for variable fuel flow through various points of injection into the combustor, (2) secondarily injected to redirect hot gases from the solid fuel, and (3) used as regenerative coolants.

It is, therefore, an object of the present invention to provide a fuel subsystem for supersonic combustion.

It is a further object of the present invention to provide such a subsystem utilizing storable and nontoxic fuels.

It is a still further object of the present invention to provide such a subsystem for a missile in which engine geometry will be fixed for varying applications of the missile.

It is yet a further object of the present invention to provide such a subsystem for a missile in which engine efficiency will be acceptable at low, high and intermediate altitudes.

It is yet a still further object of the present invention to provide such a subsystem in which engine operation will be efficient at low and high flight Mach numbers and smoothly transcend the subsonic to supersonic combustion mode.

It is another object of the present invention to provide such a subsystem for a missile which utilizes both liquid and solid fuels in a manner in which the desired features of the liquid fuels compensate for the inherent disadvantages of solid fuels and in which the the desired features of the solid fuels compensate for the inherent disadvantages of the liquid fuels.

Other features and advantages of the present invention will be more readily apparent from the following detailed description taken in conjunction with the accompanying drawing.

BRIEF DESCRIPTION OF THE DRAWING

FIG. 1 is an elevational sectional view of the missile illustrating the supersonic combustion engine and orientation of the fuel system.

FIG. 2 is a forward end view of the missile of FIG. 1.

FIG. 3 is a rear end view of the missile of FIG. 1.

DESCRIPTION OF THE PREFERRED EMBODIMENTS

Figure 4:
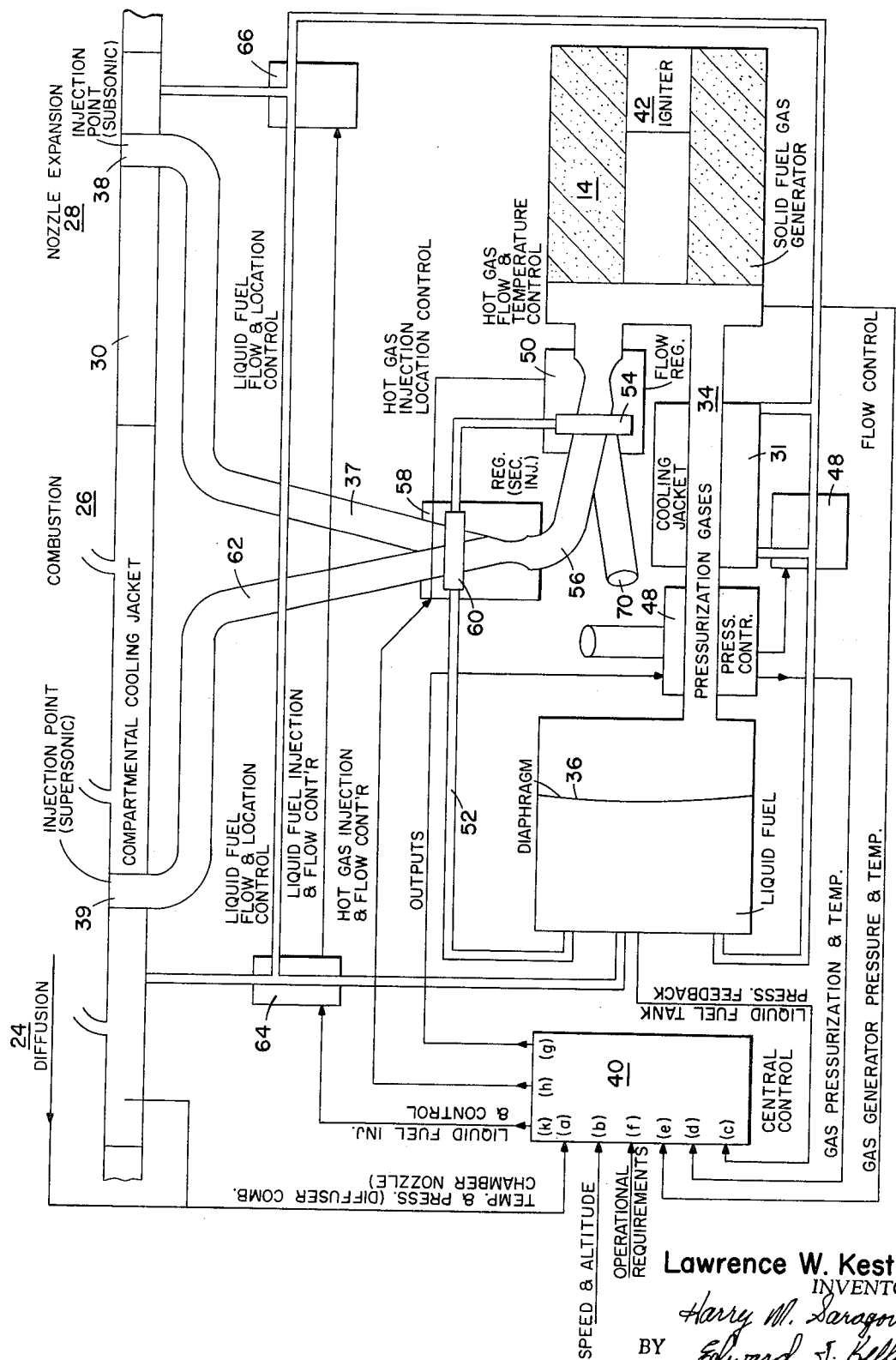
FIG. 4 is a block diagram of the fuel subsystem of the present invention.

As shown in FIG. 1, a missile 10 is shown to include a propulsion system, generally referred to by the numeral 12, including solid and liquid propellants 14 and 16, respectively.

Missile 10 includes an annular chamber 18 formed by an outer shell 20 of the missile and the liquid and solid propellant containers. At the forward end 21 of the annular chamber is an air intake 22 communicating with a diffuser 24 to pass air therein at supersonic velocities. Located just aft of the diffuser, in chamber 18, is the combustion chamber 26 and rearward of the combustion chamber is the exhaust nozzle 28. Oblique shocks are maintained as the air flows through the diffuser, combustion chamber and the nozzle. In diffuser 24, liquid fuel is injected from a regenerative cooling jacket 30 which is connected to liquid propellant tank 16 by a plurality of conduits 32.

To provide pressurization of the liquid propellant tank 16 for flow of propellant therefrom, the solid propellant is disposed in communication with the liquid propellant tank 16 by a duct 34. Responsive to ignition of the solid propellant, hot gases flow through duct 34 and to the liquid propellant tank to force a diaphragm or bladder 36 forward to pressurize the fuel tank. Hot gases from the burning solid propellant 14 are injected into combustion chamber 26 through a plurality of ducts 38 and 39. Ducts 38 are disposed for subsonic operation and ducts 39 for supersonic operation. The mixture of hot gases, vaporized liquid fuel and air are burned at supersonic velocities in the combustion chamber and are expanded through a nozzle 28 disposed between outer shell 20 and solid propellant 14.

As shown in FIG. 4, the system includes a central control station 40 where signals are received, processed and dispatched as to the status and requirements for engine operation. Included inputs into central control are temperature and pressure (a) of the fluids in the diffuser, combustion chamber and nozzle. At station (b), data on missile speed and altitude and free stream air temperature and humidity are included. Feedbacks on liquid fuel pressure is received at station (c), gas pressurization and temperature at station (d) and gas generator pressure and temperature at station (e). Central control also receives inputs as to changes in engine operational requirements at (f), such as a cruise mode, crash ahead, maneuver, or stop and restart. Outputs are shown in the block diagram of FIG. 4 as directed to the liquid fuel tank pressurization control (g), to regulate the pressure in the liquid fuel tank; hot gas injection location and flow control (h), to control direction of the solid propellant gas flown by secondary injection; and, liquid fuel injection and control (k), to control flow of liquid fuel for either the subsonic or supersonic combustion.

The fuel subsystem is designed for a multiplicity of engine operating conditions. In all cases, the subsystem is activated by firing an igniter 42 in the solid fuel gas generator 14. Hot gases are ducted through conduit 34 and through a cooling jacket 31 and a pressurization control mechanism 48, such as a pressure regulator to limit the pressure of the gases flowing to the face of diaphragm 36 which pressurizes the liquid fuel tank. Hot gases from the solid propellant are also ducted to flow regulators 50 and 58, such as a hot gas valve (fluid amplifier) or a nozzle utilizing secondary injection as shown by 54 and 60, and to the combustion chamber through ducts 38 or 39. From this point on the process is based on specific engine requirements such as those given below to illustrate the final processes:

EXAMPLE I

Assume the requirement to exist for supersonic combustion with maximum fuel flow. In such case, secondary liquid injection is accomplished by the liquid propellant flowing through conduit at 52 and secondary injection control mechanism 54 which controls the regulator 50 to cool the hot gases and deflect them to an injection duct 56. Secondary injection is also used in a regulator 58 and controlled by secondary injection control mechanism 60 to deflect the gases to a duct 62 which communicates to injection point 39 required for supersonic flow. During this process, liquid fuel is also forced by the tank pressurization to cooling jackets 30 and 31. Jacket 30 provides compartmental cooling while jacket 31 cools hot gases flowing to the liquid propellant tank.

EXAMPLE II

Subsonic combustion with reduced fuel flow: For this condition, it is desirable to have an engine that can operate efficiently with subsonic combustion until sufficient flight speed (about Mach 4) has been acquired to operate with supersonic combustion. This dual mode is accomplished in the present fixed geometry engine by locating the fuel injection points 39 forward in the diffuser for supersonic combustion and at a point 38 aft in the diffuser for the subsonic mode.

In providing subsonic combustion with reduced fuel flow, the first fuel flow reduction occurs in the liquid lines at flow regulators 64 and 66. If further reduction is required beyond termination of liquid flow, it is accomplished by deflecting the hot gases stream by secondary control mechanism 54, in flow regulator 50, to a dumping duct 70. Hot gas fuel is also deflected by secondary liquid injection through a duct 37 to the subsonic injection point 38.

The flow regulators and pressure control mechanism could advantageously be solenoid actuated and would be activated by the signals from the central control station.

The advantages of the present fuel subsystem over conventional techniques are inherent in the marriage of liquid and solid fuels. Conventional techniques utilize either solid or liquid fuels and do not mention the possibilities of using them in combination for supersonic combustion engines. Most disadvantages of either type of fuel when used separately are eliminated when they are combined. For example, hot gases are difficult to throttle and redirect from one injection point to another. However, hot fuel gases may be redirected by the secondary injection of the liquid fuel in an expanding nozzle and, therefore, throttled by dumping, if necessary. The need for throttling the hot gases can be eliminated if the variable fuel requirements are met by throttling the liquid fuel. Secondary injection is a proven art used in fluid amplification and thrust vector control, as readily appreciated from a study of U. S. Pat. No. 3,278,140, issued Oct. 11, 1966, to Kenneth C. Evans and assigned to the United States of America.

The disadvantages of solid propellants as having no cooling capability are overcome in the present system by utilizing the liquid fuel as the coolant. The volumetric capacity of the cooling jackets of the regenerative liquid fuel cooling system is considerably less than that of the fuel tank and cooling is attained by a flow of the liquid over the hot surface. Since only a part of the engine fuel requirements are provided by the liquid phase, the cooling capacity is reduced.

The factors of density, heat of combustion, carbon content and molecular weight can be compensated for by blending the thermodynamic and physical properties of the solid and liquid fuels.

In an all liquid fuel subsystem, a complex of pilot flames, mixers, and long combustion chambers are required to sustain ignition at both low and high supersonic Mach numbers. At low Mach numbers (less than 5), the air temperature (less than 1,800°R) may not be adequate for combustion of many storable fuels in a chamber of reasonable length. At high Mach numbers (over 5), the velocity in the combustion chamber may sweep out many liquids before they ignite. The injection of hot hydrogen gas from the solid fuel decomposition is expected to reduce and eliminate some of these problems, such as the pilot light.

It should also be readily apparent that hot gases from solid fuel decomposition can be utilized for pressurizing the fuel tanks and, therefore, a fuel pump or a separate source of pressurization is not required. Furthermore, the lower limit on the fuel to air ratio for inflammability is eliminated by hot hydrogen injection and the upperlimit will be considerably extended.

While the foregoing has been a description of the preferred embodiment of the invention, it should be readily understood that many variations and modifications may be resorted to that are within the spirit and scope of the appended claims.

I claim:

1. A missile having a propulsion system including solid and liquid propellants for operation of said missile at subsonic and supersonic velocities comprising: a casing enclosing said solid propellant and having a first combustion chamber for expanding gases produced by said solid propellant responsive to ignition thereof; a tank enclosing a liquid propellant, said tank disposed in communication with said first combustion chamber for receiving said gases for pressurization of said tank to effect liquid propellant flow therefrom; a second combustion chamber having an air inlet for passage of air therein and first and second groups of injection ports, each group respectively disposed in fluid communication with said first combustion chamber and said liquid propellant tank; directing means disposed for selectively routing said gases and said liquid propellant to said first group of said injection ports for the supersonic combustion or to a second plurality of injection ports for subsonic combustion; control means disposed for actuating said directing means for the routing of said gases and said liquid propellant.

2. A missile propulsion system as in claim 1 wherein said directing means includes a pair of fluid valves, the first of said fluid valves disposed in communication with said first combustion chamber and provided with a pair of outlets, the first of said outlets disposed in communication with the atmosphere, the second of said outlets having said second fluid valve disposed therein, said second fluid valve having a pair of outlets respectively disposed in communication with said groups of injection ports for selectively directing said gases therein.

3. A propulsion system as in claim 2 wherein said directing means further includes mechanism for injecting said liquid propellant into said fluid valves to divert the direction of said gases passing therethrough to a selected one of said outlets.

4. A propulsion system as in claim 3 including a plurality of conduits connecting said liquid propellant tank to said second combustion chamber and flow control means carried in said conduits to control the flow of said liquid propellant.

5. A propulsion system as in claim 4 including a conduit connecting said solid propellant to said liquid propellant tank, and pressure control means carried in said conduit to control the pressure of said gases entering said liquid fuel tank for pressurization thereof.

6. A propulsion system as in claim 5 including a plurality of cooling jackets disposed in communication with said liquid propellant tank to receive said liquid propellant therefrom, said cooling jackets disposed for cooling said gases entering said liquid propellant tank and said second combustion chamber.

7. A propulsion system as in claim 6 wherein said liquid propellant tank is provided with a diaphragm for coacting with said gases entering said propellant tank.

8. A missile propulsion system as in claim 7 wherein said control means includes a central control station disposed for receiving signals from predetermined points through said system indicative of missile speed and altitude, liquid propellant tanks pressurization and temperature, solid propellant pressure and temperature, and engine operating requirements, said control station disposed for operation of said fluid valves, said pressure control means, and said flow control means responsive to receiving said signals, whereby said propulsion system operates in the supersonic or subsonic mode.

9. A missile propulsion system as in claim 8 wherein said second combustion chamber is provided with a nozzle and said first of said groups of injection ports are disposed in the forward portion of said second combustion chamber in proximity of said air inlet and disposed to receive said liquid propellant therein, and said second of said groups of said injection ports disposed in said combustion chamber rearwardly of said first group and disposed to receive said gases from said solid propellant, whereby said liquid propellant, said gases and said air entering said air inlet are mixed in said second combustion chamber and discharged through said nozzle for the supersonic combustion.

10. A propulsion system as in claim 9 wherein said fluid valves are a pair of fluid amplifiers.

* * * * *